US 9,578,511 B2

(12) United States Patent
Kashef et al.

(10) Patent No.: US 9,578,511 B2
(45) Date of Patent: Feb. 21, 2017

(54) SYSTEMS AND TECHNIQUES FOR WIRELESS DEVICE CONFIGURATION

(71) Applicant: Libre Wireless Technologies, Inc., Irvine, CA (US)

(72) Inventors: Hooman Kashef, Coto De Caza, CA (US); Hariharan Bojan, Bangalore (IN); Jordan Watters, Spicewood, TX (US)

(73) Assignee: Libre Wireless Technologies, Inc., Irvine, CA (US)

( * ) Notice: Subject to any disclaimer, the term of this patent is extended or adjusted under 35 U.S.C. 154(b) by 0 days.

(21) Appl. No.: 14/788,741

(22) Filed: Jun. 30, 2015

(65) Prior Publication Data
US 2015/0382198 A1    Dec. 31, 2015

Related U.S. Application Data

(60) Provisional application No. 62/019,028, filed on Jun. 30, 2014.

(51) Int. Cl.
*H04L 29/08* (2006.01)
*H04W 12/08* (2009.01)
(Continued)

(52) U.S. Cl.
CPC .......... *H04W 12/08* (2013.01); *H04L 41/0803* (2013.01); *H04L 63/08* (2013.01);
(Continued)

(58) Field of Classification Search
CPC ........ H04W 12/08; H04W 12/06; H04W 8/20; H04L 63/083; H04L 63/08; H04L 67/16; H04L 67/303
(Continued)

(56) References Cited

U.S. PATENT DOCUMENTS

| 6,208,247 B1 * | 3/2001 | Agre ..................... G01V 1/223 340/13.25 |
| 7,343,014 B2 | 3/2008 | Sovio et al. |

(Continued)

OTHER PUBLICATIONS

Annex to Form PCT/ISA/206 Communication Relating to the Results of the Partial International Search for International Patent Application no. PCT/US2015/038708 mailed Oct. 27, 2015, 2 pages.

(Continued)

*Primary Examiner* — Hadi Armouche
*Assistant Examiner* — Angela Holmes
(74) *Attorney, Agent, or Firm* — Goodwin Procter LLP

(57) ABSTRACT

Systems and techniques for configuring wireless devices are described. To configure a wireless target device to access a network and/or network-based services, a wireless connection may be formed between the wireless target device and a wireless source device storing configuration data for accessing one or more networks and/or network-based services. The source device may determine whether it is authorized to send at least a portion of the configuration data to the target device. The target device may determine whether it is authorized to accept at least a portion of the configuration data provided by the source device. The target device may accept at least a portion of the configuration data by storing the accepted configuration data in a memory (e.g., a non-volatile memory) and/or by using the configuration data to access a wireless network and/or a network-based service.

30 Claims, 2 Drawing Sheets

(51) Int. Cl.
*H04W 12/06* (2009.01)
*H04L 29/06* (2006.01)
*H04W 4/00* (2009.01)
*H04L 12/24* (2006.01)
*H04W 8/20* (2009.01)

(52) U.S. Cl.
CPC ............ *H04L 63/083* (2013.01); *H04L 67/16* (2013.01); *H04L 67/303* (2013.01); *H04W 4/001* (2013.01); *H04W 8/20* (2013.01); *H04W 12/06* (2013.01)

(58) Field of Classification Search
USPC .......................................................... 726/5
See application file for complete search history.

(56) References Cited

U.S. PATENT DOCUMENTS

| | | | |
|---|---|---|---|
| 7,363,056 B2 | 4/2008 | Faisy | |
| 8,478,998 B2 | 7/2013 | Ford | |
| 8,483,661 B2 | 7/2013 | Dehlinger et al. | |
| 8,538,019 B2 | 9/2013 | Pham et al. | |
| 8,831,568 B2 | 9/2014 | Cherian et al. | |
| 8,868,038 B2 | 10/2014 | Cherian et al. | |
| 8,977,856 B2 | 3/2015 | Malek et al. | |
| 2012/0290689 A1 | 11/2012 | Beguelin et al. | |
| 2012/0304266 A1* | 11/2012 | Subramaniam | G06F 21/33 726/7 |
| 2013/0286889 A1 | 10/2013 | Cherian et al. | |
| 2013/0288601 A1 | 10/2013 | Chhabra | |
| 2014/0006569 A1 | 1/2014 | Ferrazzini et al. | |
| 2014/0056171 A1 | 2/2014 | Clegg | |
| 2014/0165165 A1 | 6/2014 | Story, Jr. | |
| 2014/0220887 A1* | 8/2014 | Yang | H04B 5/0043 455/41.1 |
| 2014/0302842 A1 | 10/2014 | Lloyd et al. | |
| 2014/0335823 A1* | 11/2014 | Heredia | H04L 12/5895 455/411 |

OTHER PUBLICATIONS

Written Opinion for International Patent Application No. PCT/US2015/038708, published Jan. 12, 2016, 9 pages.

* cited by examiner

SYSTEMS AND TECHNIQUES FOR WIRELESS DEVICE CONFIGURATION

CROSS REFERENCE TO RELATED APPLICATION(S)

This application claims priority and benefit under 35 U.S.C. 119(e) of U.S. Provisional Patent Application No. 62/019,028, titled "Wireless Device Configuration" and filed on Jun. 30, 2014, which is hereby incorporated by reference to the maximum extent permitted by applicable law.

FIELD OF INVENTION

The present disclosure relates generally to wireless networks and wireless devices. Some embodiments relate specifically to system and techniques for configuring wireless devices.

BACKGROUND

Some electronic devices use communications networks to send and receive information. Communications networks have a variety of attributes, including scope, communication protocol, interconnection technique, transmission medium, etc. For example, depending on a communication network's geographic scope, the network may be classified as a wide area networks (WAN), metropolitan area network (MAN), local area network (LAN), personal area networks (PANs), etc. Examples of communication protocols include the Internet protocol suite, Transmission Control Protocol/Internet Protocol (TCP/IP), High-Level Data Link Control (HDLC) protocol, Medium Access Control (MAC) protocol, User Datagram Protocol (UDP), Internet Control Message Protocol (ICMP), Hypertext Transfer Protocol (HTTP), Post Office Protocol (POP), File Transfer Protocol (FTP), Internet Message Access Protocol (IMAP), etc. Interconnection techniques may include circuit switching, packet switching, etc. Examples of transmission media include "wired" media (e.g., optical fibers, electrically-conductive wires) and "wireless" media.

In a "wireless network," information may be communicated between two devices via electromagnetic signals that propagate between the devices through a medium other than a wired medium (e.g., through the air). Such electromagnetic signals may include radio-frequency signals, infrared signals, optical signals, etc. Many types of wireless networks are known, including Wi-Fi networks (e.g., networks compliant with one or more of the IEEE 802.11 standards), WiMAX networks, mobile voice networks (e.g., cellular telephone networks, GSM, GPRS, CDMA, EVDO, UMTS, etc.), mobile data networks (e.g., 3G, 4G, LTE, GSM, CDMA, W-CDMA, EDGE, CDMA2000, etc.), mobile satellite communications networks, wireless sensor networks, etc.

Wireless communication devices (or "wireless devices") may be used to access wireless networks. Generally, before a wireless device communicates over a wireless network, the wireless device is configured to access the wireless network. The configuration process generally involves providing the wireless device with configuration data that the device can use to access the wireless network. One technique for configuring a wireless device to access a wireless network involves a user manually entering at least some of the configuration data into the wireless device via a user interface of the wireless device.

SUMMARY OF THE INVENTION

Motivation for Some Embodiments of the Invention

The number of wireless devices in operation is increasingly rapidly. In addition to a steady increase in the deployment of wireless devices (e.g., laptop computers, tablet computers, smartphones, smart televisions, etc.) with sophisticated user interfaces (e.g., displays, keyboards, keypads, touchpads, touchscreens, etc.) there is also rapid growth in the deployment of "headless" wireless devices, which have less sophisticated user interfaces. In some embodiments, a headless wireless device may have a network interface, but no display, no input interface (e.g., no keyboard, keypad, touchpad, touchscreen, etc.), a very limited input interface (e.g., a small number of buttons or switches), or no display and no input interface (or a very limited input interface). Some headless wireless devices may be used in medical devices, industrial automation devices, home automation devices, automobiles, "Internet of Things" (IOT) devices, etc.

Existing techniques for configuring wireless devices to access wireless networks are inadequate. In general, configuring a wireless device to access a wireless network may involve registering the device with a wireless access point ("wireless AP") and providing the wireless device with data that the wireless device can use to connected to the wireless AP. Many wireless devices with sophisticated user interfaces may be configured by executing software that searches for nearby wireless APs and displays the APs on the device's display, selecting a wireless AP via the device's input interface, and manually entering a password associated with the wireless AP via the device's input interface. One drawback of this manual configuration technique is that it may encourage users to set up wireless APs with passwords that are short and easy to remember. Such passwords may be particularly insecure.

Many headless wireless devices may be configured using multi-step manual processes. Such processes may be cumbersome and error prone. For example, configuring a headless device may involve manually placing the device in a special mode (e.g., a Soft Access Point or "SoftAP" mode). Placing the device in the special mode may involve physically manipulating the headless device (e.g., by pressing a button or activating a switch on the surface of the device's casing, by entering a sequence of key presses, by activating a combination of buttons or switches, or by setting up a wired connection between the headless device and a device with a more sophisticated user interface). Configuring the headless device may further involve using a wireless device with a sophisticated user interface to wirelessly connect to the headless device while the headless device is in the special mode, and remotely accessing the headless device's user interface through the sophisticated wireless device. The headless device's user interface may be remotely accessed, for example, by navigating an internet browser to the IP address of the headless device, or by using a discovery protocol (e.g., uPnP/DLNA, Bonjour, a proprietary discovery and control protocol, etc.). Through the remote user interface, the user may then cause the headless to device to scan for wireless APs, select the desired AP, and manually configure the headless device to connect to the selected AP (e.g., by entering a password). The user may then reset the headless device (e.g., by activating a reset button, or by power cycling the headless device).

Some efforts have been made to develop techniques for automatically configuring wireless devices to access wireless networks (e.g., Wi-Fi Protected Setup or "WPS"), but these techniques may require the user to physically access the wireless AP, which can be difficult or infeasible, since wireless APs may be deployed in hard-to-reach locations, including attics, crawlspaces, ceilings, etc. Furthermore, such techniques may be insecure (e.g., some WPS techniques make the underlying wireless networks vulnerable to brute force attacks). The inconvenience and insecurity of such techniques may limit the market for wireless devices. Thus, there is a need for secure systems and techniques for automatically configuring wireless devices to access wireless networks. Preferably, such techniques would not require users to physically access wireless APs.

There is also a need for secure systems and techniques for automatically configuring wireless devices to access network-based services. Configuring a wireless device to access a network-based service may involve supplying the wireless device with an address of the network-based service provider (e.g., a URL), and a username and password for a user's account with the network-based service.

According to an aspect of the present disclosure, techniques for configuring a wireless target device to access a network and/or network-based services is provided. A wireless connection may be formed between a wireless source device storing configuration data for accessing one or more networks and/or network-based services and a wireless target device capable of being configured to access one or more networks and/or network-based services. The source device may determine whether it is authorized to send at least a portion of the configuration data to the target device. Determining whether the source device is authorized to send the configuration data to the target device may comprise, for example, (1) identifying one or more network-based services compatible with the target device based, at least in part, on the one or more attributes of the target device (e.g., the target device's type), (2) determining whether the source device is authorized to transmit configuration data for accessing one or more networks, (3) determining whether a user has physical access to the source device and/or the target device, and/or (4) determining whether the proximity of the source device to the target device satisfies one or more criteria.

The target device may determine whether it is authorized to accept at least a portion of the configuration data provided by the source device. Determining whether the target device is authorized to accept configuration data may comprise, for example, (1) determining, based on the attributes of the target device (e.g., the target device's type), whether the target device is compatible with one or more network-based services corresponding to the configuration data, (2) determining whether the target device is authorized to access one or more networks corresponding to the configuration data, (3) determining whether a user has physical access to the source device and/or the target device, and/or (4) determining whether the proximity of the source device to the target device satisfies one or more criteria.

Summary

According to an aspect of the present disclosure, an apparatus is provided, comprising: one or more wireless transceivers; and a processor configured to perform operations comprising: using at least one of the one or more wireless transceivers to receive, from a device, data including one or more attributes of the device, based, at least in part, on the one or more attributes of the device, identifying one or more network-based services compatible with the device, and using at least one of the one or more wireless transceivers to transmit, to the device, network access credentials for accessing one or more networks and service access credentials for accessing the one or more network-based services compatible with the device.

In some embodiments, the one or more attributes of the device include an identifier of the device. In some embodiments, the one or more attributes of the device include a type of the device. In some embodiments, the device type comprises a health type, an audio type, a video type, a monitoring type, a control type, a building automation type, an energy management type, and/or a communication type. In some embodiments, identifying one or more network-based services compatible with the device based, at least in part, on the one or more attributes of the device comprises identifying one or more network-based services compatible with the device based, at least in part, on the device type. In some embodiments, identifying one or more network-based services compatible with the device based, at least in part, on the device type, comprises: determining that the device type comprises an audio type; and identifying one or more network-based services providing access to audio content.

In some embodiments, the network access credentials for accessing the one or more networks comprise network access credentials for accessing a wireless broadband network, a cellular communications network, a mobile communications network, and/or a Wi-Fi network. In some embodiments, the service access credentials comprise a uniform resource locator (URL) of the network-based service, a username for an account associated with the network-based service, a password for the network-based service account, a personal identification number (PIN) for the network-based account, a public encryption key for encrypting communications sent to the network-based service, a private encryption key for decrypting communications received from the network-based service, and/or an authentication certificate.

In some embodiments, the operations further comprise selecting, from a plurality of networks, the one or more networks for which the network access credentials are to be transmitted to the device, wherein the one or more networks are selected based, at least in part, on a determination that the apparatus is authorized to transmit network access credentials of the one or more networks to the device. In some embodiments, the operations further comprise: obtaining network access credentials for the plurality of networks; and receiving, for the one or more networks, data indicating that the apparatus is authorized to transmit network access credentials of the one or more networks to any device. In some embodiments, the operations further comprise: obtaining network access credentials for the plurality of networks; and receiving, for the one or more networks, data indicating that the apparatus is authorized to transmit network access credentials of the one or more networks to a device having a specified device identifier and/or to devices of a specified type.

In some embodiments, the apparatus further comprises a physical access sensor configured to detect a physical access of the apparatus by a user, wherein the operations further comprise receiving a signal from the physical access sensor indicating that a physical access of the apparatus has been detected, and wherein the processor is configured to transmit the network access credentials and the service access credentials based, at least in part, on receiving the signal indicating detection of the physical access to the apparatus. In some embodiments, the physical access sensor comprises an electromechanical button, an electromechanical switch, a touchscreen, a touch pad, a light sensor, and/or a camera.

In some embodiments, the apparatus further comprises a proximity sensor configured to determine a proximity of the device to the apparatus, wherein the operations further comprise determining whether the proximity of the device to the apparatus satisfies one or more criteria, and wherein the processor is configured to transmit the network access credentials and the service access credentials based, at least in part, on a determination that the proximity of the device to the apparatus satisfies the one or more criteria. In some embodiments, the proximity sensor comprises a wireless signal sensor configured to determine a power level of a wireless signal received from the device, and wherein determining whether the proximity of the device to the apparatus satisfies the one or more criteria comprises determining whether the power level of the wireless signal received from the device exceeds a threshold power level. In some embodiments, the proximity sensor comprises an acoustic sensor configured to sense an acoustic carrier signal received from the device, and wherein determining whether the proximity of the device to the apparatus satisfies the one or more criteria comprises determining whether a power level of an analog or digital coded signal modulated on the acoustic carrier signal exceeds a threshold power level. In some embodiments, the proximity sensor comprises an infrared sensor, and wherein determining whether the proximity of the device to the apparatus satisfies the one or more criteria comprises determining whether the infrared sensor has received an infrared signal from the device.

In some embodiments, the one or more wireless transceivers comprise a radio-frequency (RF) transceiver, a Wi-Fi transceiver, a transceiver configured to comply with an IEEE 802.11 standard, an optical transceiver, a near field communication (NFC) transceiver, an infrared transceiver, and/or a Bluetooth transceiver. In some embodiments, the processor comprises a microprocessor device, microcontroller device, application-specific integrated circuit (ASIC), field-programmable gate array (FPGA), digital signal processor (DSP) device, central processing unit (CPU), and/or graphics processing unit (GPU).

According to another aspect of the present disclosure, a system is provided, comprising: a first endpoint device configured to perform operations including wirelessly transmitting data including one or more attributes of the first endpoint device; and a second endpoint device configured to perform operations including: wirelessly receiving, from the first endpoint device, the data including the one or more attributes of the first endpoint device, based, at least in part, on the one or more attributes of the first endpoint device, identifying one or more network-based services compatible with the first endpoint device, and wirelessly transmitting, to the first endpoint device, network access credentials for accessing one or more networks and service access credentials for accessing the one or more network-based services compatible with the device.

In some embodiments, the one or more attributes of the first endpoint device include a type of the first endpoint device. In some embodiments, identifying one or more network-based services compatible with the first endpoint device based, at least in part, on the one or more attributes of the first endpoint device comprises identifying one or more network-based services compatible with the first endpoint device based, at least in part, on the first endpoint device type.

In some embodiments, the second endpoint device is further configured to perform operations including selecting, from a plurality of networks, the one or more networks for which the network access credentials are to be transmitted to the first endpoint device, wherein the one or more networks are selected based, at least in part, on a determination that the second endpoint device is authorized to transmit network access credentials of the one or more networks to the first endpoint device. In some embodiments, the second endpoint device is further configured to perform operations including: obtaining network access credentials for the plurality of networks; and receiving, for the one or more networks, data indicating that the second endpoint device is authorized to transmit network access credentials of the one or more networks to other devices. In some embodiments, the second endpoint device is further configured to perform operations including: obtaining network access credentials for the plurality of networks; and receiving, for the one or more networks, data indicating that the second endpoint device is authorized to transmit network access credentials of the one or more networks to a device having a specified device identifier and/or to devices of a specified type.

In some embodiments, the first endpoint device comprises a physical access sensor configured to detect a physical access of the first endpoint device by a user, and wherein the first endpoint device is further configured to perform operations comprising: receiving a signal from the physical access sensor indicating that a physical access of the first endpoint device has been detected, entering a discovery mode, and in the discovery mode, accepting the network access credentials and the service access credentials transmitted by the second endpoint device.

In some embodiments, the first endpoint device comprises a proximity sensor configured to determine a proximity of the second endpoint device to the first endpoint device, and wherein the first endpoint device is further configured to perform operations comprising: determining whether the proximity of the second endpoint device to the first endpoint device satisfies one or more criteria, entering a discovery mode based on determining that the proximity of the second endpoint device to the first endpoint device satisfies the one or more criteria, and in the discovery mode, accepting the network access credentials and the service access credentials transmitted by the second endpoint device.

In some embodiments, the proximity sensor comprises a wireless signal sensor configured to determine a power level of a wireless signal received from the second endpoint device, and wherein determining whether the proximity of the second endpoint device to the first endpoint device satisfies the one or more criteria comprises determining whether the power level of the wireless signal received from the second endpoint device exceeds a threshold power level.

In some embodiments, the proximity sensor comprises an acoustic sensor configured to sense an acoustic carrier signal received from the second endpoint device, and wherein determining whether the proximity of the second endpoint device to the first endpoint device satisfies the one or more criteria comprises determining whether a power level of an analog or digital coded signal modulated on the acoustic carrier signal exceeds a threshold power level.

In some embodiments, the proximity sensor comprises an infrared sensor, and wherein determining whether the proximity of the second endpoint device to the first endpoint satisfies the one or more criteria comprises determining whether the infrared sensor has received an infrared signal from the second endpoint device.

According to another aspect of the present disclosure, an apparatus is provided, comprising: one or more wireless transceivers; and a processor configured to perform operations comprising: using at least one of the one or more wireless transceivers to receive, from a device, network access credentials for accessing one or more networks and service access credentials for accessing the one or more network-based services, based, at least in part, on one or more attributes of the apparatus, identifying, from among the one or more network-based services, at least one network-based service compatible with the device, using at least one of the one or more wireless transceivers to transmit, to a network access point, at least a portion of the network access credentials, and to connect to a network via the network access point, using at least one of the one or more wireless transceivers to transmit, to the at least one network-based service and via the network, a portion of the service access credentials corresponding to the at least one network-based service, and accessing the network-based service via the network.

In some embodiments, the apparatus further comprises a proximity sensor, wherein the operations further comprise: determining, using the proximity sensor, a proximity of the apparatus to the device; and determining whether the proximity of the apparatus to the device satisfies one or more criteria, and wherein transmitting the network access credentials to the network access point is performed in response to determining that the proximity of the apparatus to the device satisfies the one or more criteria.

According to another aspect of the present disclosure, an apparatus is provided, comprising: one or more wireless transceivers; a proximity sensor; and a processor configured to perform operations comprising: transmitting, using at least one of the one or more wireless transceivers, data including one or more attributes of the apparatus, receiving, using at least one of the one or more wireless transceivers, network access credentials for accessing one or more networks and/or service access credentials for accessing one or more network-based services compatible with the apparatus, the network access credentials and/or the service access credentials being received from a device, determining, using the proximity sensor, a proximity of the device to the apparatus, determining whether the proximity of the device to the apparatus satisfies one or more criteria, and in response to determining that the proximity of the device to the apparatus satisfies the one or more criteria, accepting the network access credentials and/or the service access credentials received from the device.

In some embodiments, accepting the network access credentials comprises storing the network access credentials in non-volatile memory and/or using at least a portion of the network access credentials to access at least one of the one or more networks. In some embodiments, accepting the service access credentials comprises storing the service access credentials in non-volatile memory and/or using at least a portion of the service access credentials to access at least one of the one or more network-based services.

In some embodiments, the apparatus further comprises a physical access sensor configured to detect a physical access of the apparatus by a user, wherein the data including the one or more attributes of the apparatus are transmitted based on the physical access sensor detecting a physical access of the apparatus by a user.

In some embodiments, the one or more network-based services are identified by the device based, at least in part, on the one or more attributes of the apparatus.

According to another aspect of the present disclosure, an apparatus is provided, comprising: one or more wireless transceivers; a proximity sensor; and a processor configured to perform operations comprising: determining, using the proximity sensor, a proximity of a device to the apparatus, determining whether the proximity of the device to the apparatus satisfies one or more criteria, in response to determining that the proximity of the device to the apparatus satisfies the one or more criteria, transmitting, to the device, network access credentials for accessing one or more networks and/or service access credentials for accessing one or more network-based services.

In some embodiments, the operations further comprise using at least one of the one or more wireless transceivers to receive, from the device, a beacon message, wherein determining the proximity of the device to the apparatus comprises determining the proximity of the device to the apparatus based, at least in part, on a signal encoding the beacon message.

In some embodiments, the operations further comprise: using at least one of the one or more wireless transceivers to receive, from the device, data including one or more attributes of the device, and based, at least in part, on the one or more attributes of the device, identifying one or more network-based services compatible with the device, wherein transmitting the service access credentials comprises transmitting one or more service access credentials, respectively, for the one or more network-based services compatible with the device.

These and other objects, along with advantages and features of the embodiments described in the present disclosure, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

Advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of some embodiments.

DETAILED DESCRIPTION

Figure 1:
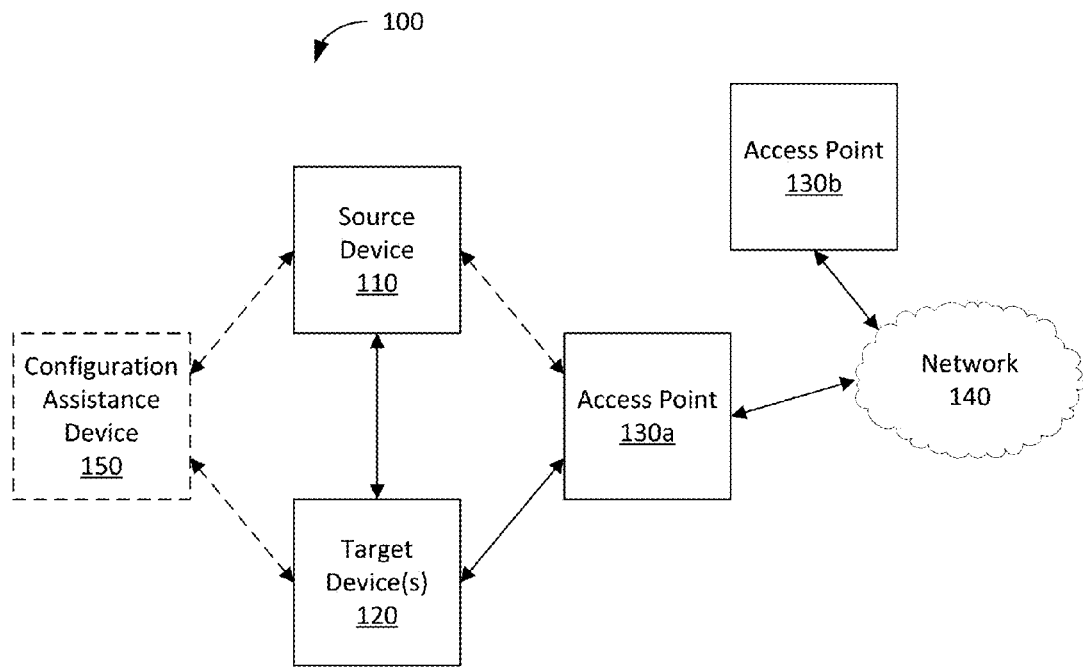
FIG. 1 shows a block diagram of a system for configuring a wireless device, according to some embodiments.

FIG. 1 shows a system 100 for configuring a wireless device to access a wireless network and/or a network-based service, according to some embodiments. In some embodiments, system 100 includes a source wireless device 110 and one or more target wireless devices 120. The source wireless device 110 may be operable to transmit, to the target device(s) 120, configuration data for accessing a wireless network 140 and/or a network-based service. The target device(s) 120 may be operable to receive configuration data provided by source device 110, and to use the configuration data provided by source device 110 to connect to network 140 via a wireless access point 130.

Before transmitting configuration data to a target device 120, source device 110 may determine whether it is authorized to transmit the configuration data to the target device. In some embodiments, determining whether source device 110 is authorized to transmit configuration data to the target device 120 may comprise communicating with a configuration assistance device 150. Before using the configuration data provided by source device 110, a target device 120 may determine whether it is authorized to accept the configuration data. In some embodiments, determining whether target device 120 is authorized to accept configuration data provided by source device 110 may comprise communicating with a configuration assistance device 150.

Configuration data may include any data that facilitates access, by a wireless device, to a wireless network and/or a network-based service. In some embodiments, data that facilitates access to a wireless network may include, without limitation, network access credentials (e.g., an identifier of the wireless network (e.g., a Service Set Identifier or "SSID"), a password for connecting to the wireless network 140 via an access point 130, etc.), network settings, etc. In some embodiments, data that facilitates access to a network-based service may include, without limitation, an address of the network-based service (e.g., an IP address, a Uniform Resource Locator (URL), etc.); service access credentials (e.g., a username, personal identification number (PIN), and/or password for the network-based service (e.g., for an account with the network-based service), a public encryption key for encrypting communications sent to the network-based service, a private encryption key for decrypting communications received from the network-based service, an authentication certificate, etc.); a description of the network-based service (e.g., the type(s) of service(s) provided by the network-based service, the type of content available through the network-based service, etc.).

Network-based services may include any services accessible via a network (e.g., a wireless network 140), including, without limitation, services that provide content (e.g., music, other audio, images, videos, literature, etc.), services that provide storage (e.g., cloud-based storage), services that provide processing resources (e.g., data centers), services that perform predetermined types of processing (e.g., search services, navigation services, reservation services, etc.), etc. Some examples of network-based services include email services (e.g., GMAIL), video streaming services (e.g., YOUTUBE, NETFLIX), audio streaming services (e.g., PANDORA), and content distribution services (e.g., APP STORE, GOOGLE PLAY, AMAZON, etc.).

Discovery

Source device 110 may be operable to perform a discovery process to discover the presence of target devices proximate to the source device. In some embodiments, source device 110 performs the discovery process continually (e.g., periodically, intermittently, at predetermined intervals, etc.). In some embodiments, source device 110 performs the discovery process when operating in a "discovery mode". In some embodiments, source device 110 enters the "discovery mode" in response to receiving a communication from a target device 120. In some embodiments, source device 110 enters the "discovery mode" in response to a user manually initiating the discovery mode. In some embodiments, a user manually initiates the discovery mode by activating a physical input interface on the source device 110 (e.g., by pressing a button, activating a switch, etc.), by providing an input to a software user interface of the source device 110, or by establishing a wired connection between source device 110 and a target device 120. In some embodiments, the source device may enter the discovery mode in response to a signal provided by a sensor (e.g., a proximity sensor). The sensor signal may indicate that a target device 120 is proximate to the source device. Any suitable sensor may be used, including, without limitation, a Near Field Coupling (NFC) receiver, an acoustic coupling sensor, a Bluetooth transceiver (e.g., a Bluetooth Low Energy transceiver), etc.

In some embodiments of the discovery process, source device 110 broadcasts a message (e.g., a beacon), indicating that the source device 110 is available for configuring target devices, and monitors received communications for messages indicating that a target device 120 is available to be configured. In some embodiments of the discovery process, source device 110 monitors received communications for messages indicating that a target device 120 is available to be configured, without broadcasting a message indicating that the source device 110 is available to configure target devices.

Source device 110 may transmit the discovery message using any suitable transmission medium, including, without limitation, transmitting the discovery message wirelessly, or transmitting the discovery message via a wire connecting the source device 110 to a target device 120 or to a network. Source device 110 may transmit the discovery message using any suitable communication protocol or standard, including, without limitation, Wi-Fi, Bluetooth, Near-Field Communication (NFC), Ethernet, etc. In some embodiments, target device 120 may transmit and/or receive discovery messages using low-level protocols, including, without limitation, beacon frames, probe requests, radio-frequency signaling tones, and/or audio signaling tones.

In some embodiments, the discovery message transmitted by the source device 110 includes information identifying the source device 110. Such information may include, but is not limited to, a device identifier (e.g., a unique device identifier), and/or an address of the source device (e.g., an IP address, MAC address, etc.). In some embodiments, the discovery message transmitted by the source device 110 includes data (e.g., a code) indicating that the source device 110 is available for configuring target devices. In some embodiments, the source device transmits the discovery message in a beacon message (e.g., in the Information Element Identifier (IEI) field of an 802.11 beacon packet). In some embodiments, the discovery message transmitted by the source device 110 is encrypted.

In some embodiments, the discovery message received by the source device 110 from the target device 120 includes information identifying the target device 120. Such information may include, but is not limited to, a device identifier (e.g., a unique device identifier), and/or an address of the source device (e.g., an IP address, MAC address, etc.). In some embodiments, the received message includes data (e.g., a code) identifying a provider (e.g., vendor, manufacturer, distributor, etc.) of the target device. In some embodiments, the message received by the source device 110 includes data (e.g., a code) indicating that the target device 120 is available to be configured. In some embodiments, the source device 110 receives the target device's discovery message in a beacon message (e.g., in the Information Element Identifier (IEI) field of an 802.11 beacon packet). In some embodiments, the discovery message received by the source device 110 is encrypted.

The message received by the source device 110 from the target device 120 may include data (e.g., a code) identifying the one or more of the target device's attributes, including, without limitation, the target device's type. In some embodiments, the target device's type may indicate one or more capabilities of the target device, including, without limitation, an audio output capability (for devices capable of providing audio output, e.g., speakers, earphones, smartphones, tablet computers, laptop computers, televisions, etc.), an audio input capability (for devices capable of recording or processing audio input, e.g., microphones, smartphones, etc.), a video output capability (for devices capable of providing video output, e.g., displays, smartphones, tablet computers, laptop computers, televisions, etc.), a video input capability (for devices capable of recording or processing video input, e.g., video cameras, web cameras, smartphones, tablet computers, laptop computers, etc.), an image output capability (for devices capable of displaying or otherwise presenting images, e.g., displays, smartphones, tablet computers, laptop computers, televisions, electronic picture frames, printers, etc.), an image input capability (for devices capable of capturing or processing image input, e.g., video cameras, web cameras, smart phones, tablet computers, laptop computers, still cameras), a mobile communications capability (for devices capable of communicating via a mobile telecommunications network, e.g., smartphones, mobile hot spots, etc.), etc.

In some embodiments, the target device's type may indicate one or more applications of the target device, including, without limitation, promoting health (e.g., for medical devices, fitness tracking devices, health-monitoring devices, etc.), monitoring a physical space (e.g., for video cameras, microphones, baby monitors, motion sensors, proximity sensors, acoustic sensors, light-level sensors, etc.), controlling systems (e.g., for building automation devices, including home automation devices and/or industrial automation devices), managing resources (e.g., for utility meters, gas meters, electrical meters, water meters, etc.), etc.

Target device 120 may be operable to perform a discovery process to discover the presence of source devices proximate to the target device. In some embodiments, target device 120 performs the discovery process continually (e.g., periodically, intermittently, at predetermined intervals, etc.). In some embodiments, target device 120 performs the discovery process when operating in a "discovery mode". In some embodiments, target device 120 enters the "discovery mode" in response to a user manually initiating the discovery mode. In some embodiments, a user manually initiates the discovery mode by activating a physical input interface on the target device 120 (e.g., by pressing a button, activating a switch, etc.), or by establishing a wired connection between target device 120 and a source device 110. In some embodiments, target device 120 enters the "discovery mode" in response to being power cycled. In some embodiments, target device 120 enters the "discovery mode" in response to determining that the target device 120 is not configured to access a wireless network, is configured to access a wireless network but is unable to connect to a wireless network, is not configured to access a network-based service, or is configured to access a network-based service but is unable to connect to the network-based service. The target device 120 may make such determinations at any suitable time, including, without limitation, periodically, intermittently, at scheduled times, in response to being power cycled, and/or in response to a user activating a physical input interface of the target device.

In some embodiments of the discovery process, target device 120 broadcasts a message (e.g., a beacon), indicating that the target device 120 is available to be configured, and monitors received communications for messages indicating that a source device 110 is available to configure the target device. In some embodiments of the discovery process, target device 120 monitors received communications for messages indicating that a source device 110 is available to configure the target device, without broadcasting a message indicating that the target device 120 is available to be configured.

Target device 120 may transmit the discovery message using any suitable transmission medium, including, without limitation, transmitting the discovery message wirelessly, or transmitting the discovery message via a wire connecting the target device 120 to a source device 110 or to a network. Target device 120 may transmit the discovery message using any suitable communication protocol or standard, including, without limitation, Wi-Fi, Bluetooth, Near-Field Communication (NFC), Ethernet, etc. In some embodiments, target device 120 may transmit and/or receive discovery messages using low-level protocols, including, without limitation, beacon frames, probe requests, radio-frequency signaling tones, and/or audio signaling tones.

In some embodiments, the target device 120 and the source device 110 may transmit discovery messages and/or responses using the same transmission medium, communication protocol, and/or communication standard. In some embodiments, the target device 120 and the source device 110 may transmit discovery messages and/or responses using different transmission media, communication protocols, and/or communication standards.

Embodiments of the discovery message transmitted by the target device 120 to the source device 110 have been described. For brevity, this description is not repeated here.

In some embodiments, the source device 110 and the target device 120 may enter the discovery mode only if a user initiates the discovery modes on both devices concurrently. Initiating the discovery modes concurrently may comprise performing any of the above-described acts for initiating the discovery mode of the source device, while concurrently performing any of the above-described acts for initiating the discovery mode of the target device. In some embodiments, concurrently initiating the discovery modes may comprise concurrently activating physical input interfaces (e.g., buttons, switches, etc.) of the source device and the target device, respectively.

In some embodiments, the source device 110 and the target device 120 perform the above-described discovery techniques without connecting to an access point (AP), or without communicating through any access points to which either of the devices may be connected. In some embodiments, the source device 110 and the target device 120 perform the discovery process using point-to-point communication, a direct communication link, a mesh network, or any other suitable networking protocol or topology that does not rely on a central access point (AP).

In some embodiments, the discovery techniques implemented by the source device 110 and/or the target device 120 may improve the security of automatic techniques for configuring wireless devices. For example, allowing the user to initiate and/or terminate the discovery process may limit the occurrence of "false discovery" scenarios (e.g., the discovery, by a source device, of a target device that is not available for reconfiguration, or the discovery of a target device by an unauthorized, third-party source device).

Authorization (Source Device)

After discovering a target device 120, source device 110 may determine whether transmission of configuration data to target device 120 is authorized. In some embodiments, determining whether transmission of configuration data to a target device is authorized comprises (1) authenticating the target device, (2) determining whether the proximity of the source device to the target device satisfies one or more criteria, (3) determining whether a user has physical access to the source device and/or the target device, (4) determining whether the target device is compatible with the wireless network(s) and/or network-based service(s) corresponding to the configuration data, and/or (5) determining whether the source device has permission from the provider of the configuration data to redistribute the configuration data. Source device 110 may use any suitable combination of these authorization techniques in any suitable order. Each of the authorization techniques is described in turn below.

Authentication-Based Authorization.

Source device 110 may use any suitable authentication technique to authenticate target device 120. In some embodiments, the authentication may be software-based (e.g., certificates may be used), hardware-based (e.g., Trusted Platform Modules (TPMs) or Crypto Integrated Circuits may be used), or software- and hardware-based. In some embodiments, the authentication technique may be symmetric or asymmetric. In some embodiments, any authentication keys used by the source device 110 and/or the target device 120 may be protected using suitable encryption techniques, including, without limitation, SHA1, SHA2, AES-CCM/GCM, RSA, ECC, etc.

In some embodiments, source device 110 may use special-purpose hardware to accelerate the computational portions of the authentication process. In some embodiments, the hardware accelerator may be integrated with the source device's processor in a multi-core processor, multi-processor chip, system-on-a-chip (SoC), application specific integrated circuit (ASIC), etc. In some embodiments, the hardware accelerator may be deployed on a separate chip or in a separate package from the source device's processor, and communicatively coupled to the source device's processor.

In some embodiments, if source device 110 is unable to authenticate target device 120, source device 110 may refrain from distributing some or all of the source device's configuration data to the target device 120.

Proximity-Based Authorization.

In some embodiments, source device 110 includes a proximity sensor. Any suitable proximity sensor may be used, including, without limitation, a wireless signal sensor (e.g., an infrared sensor) or an acoustic signal sensor. Further embodiments of proximity sensors are described below with reference to FIG. 2.

In some embodiments, source device 110 uses the proximity sensor to determine the proximity of the source device 110 to a target device 120. In some embodiments, the granting of authorization for source device 110 to transmit configuration data to target device 120 may be conditioned on the proximity of the source device 110 to the target device 120 satisfying one or more proximity-based authorization criteria.

Determining whether the proximity of the source device 110 to the target device 120 satisfies the proximity-based authorization criteria may comprise determining a power level of a wireless electromagnetic signal received by the source device 110 from the target device 120, and comparing the power level to a threshold power level. If the signal's power level is greater than the threshold power level, the source device 110 may determine that the proximity-based authorization criteria are met (e.g., because the target device 120 is sufficiently proximate to the source device 110). In some embodiments, the threshold power level for a wireless signal may be the expected power level for a wireless signal received from a target device disposed in the same room as the source device, with line of sight to the source device (e.g., 50 dBm). In some embodiments, the threshold power level may depend on the type of wireless signal received and/or the communication protocol or standard to which the wireless signal conforms.

Determining whether the proximity of the source device 110 to the target device 120 satisfies the proximity-based authorization criteria may comprise determining a power level of an acoustic signal received by the source device 110 from the target device 120, and comparing the power level to a threshold power level. (In addition or in the alternative, the source device 110 may determine the power level of analog or digital coded signals modulated on an acoustic carrier signal.) If the signal's power level is greater than the threshold power level, the source device 110 may determine that the proximity-based authorization criteria are met (e.g., because the target device 120 is sufficiently proximate to the source device 110). In some embodiments, the threshold power level for an acoustic signal may be the expected power level for an acoustic signal received from a target device disposed in the same room as the source device. In some embodiments, the threshold power level may depend on the attributes of the acoustic signal received (e.g., tone, pitch, etc.).

Determining whether the proximity of the source device 110 to the target device 120 satisfies the proximity-based authorization criteria may comprise determining whether the source device 110 and the target device 120 are able to communicate using infrared signals. Since infrared signals generally have low range, the source device 110 may determine that the proximity-based authorization criteria are met (e.g., because the target device 120 is sufficiently proximate to the source device 110) if the devices are able to communicate using infrared signals.

In some embodiments, the performance of proximity-based authentication by source device 110 may be conditioned on source device 110 confirming that the signals (e.g., wireless electromagnetic signals, acoustic signals, infrared signals, etc.) received by the source device are, in fact, transmitted by the target device. In some embodiments, if the source device 110 is unable to confirm the provenance of a signal, the source device does not rely on that signal for proximity-based authorization.

In some embodiments, requiring the source device to obtain proximity-based authorization before sending configuration data to a target device may enhance the security of automated configuration techniques. In particular, requiring proximity-based authorization may provide protection against scenarios in which (1) a third party deploys a target device in a region that is not proximate to the source device (e.g., not in the same room with the source device, or not in the same building with the source device), and attempts to use the source device to connect the unauthorized target device to a network, or (2) a source device inadvertently attempts to automatically reconfigure a target device that is not proximate to the source device (e.g., a target device in a neighbor's house, or in a colleague's office).

Access-Based Authorization.

In some embodiments, source device 110 includes an access sensor (e.g., a physical access sensor). When a user accesses (e.g., physically accesses) the source device, the access sensor may detect that the device has been accessed. Examples of accessing the source device may include handling the source device, touching certain areas of the source device, etc. Any suitable access sensor may be used, including, without limitation, an electromechanical button, an electromechanical switch, a touchscreen, a touch pad, a light sensor, and/or a camera. Further embodiments of access sensors are described below with reference to FIG. 2.

In some embodiments, source device 110 uses the access sensor to determine whether a user is accessing (e.g., physically accessing) or proximate to the source device. In some embodiments, the granting of authorization for source device 110 to transmit configuration data to target device 120 may be conditioned on the access sensor determining that a user is accessing or has recently accessed the source device.

In some embodiments, requiring the source device to obtain access-based authorization before sending configuration data to a target device may enhance the security of automated configuration techniques. In particular, requiring access-based authorization may provide protection against scenarios in which (1) a third party who does not have access to the source device attempts to use the source device to connect an unauthorized device to a network, or (2) a source device inadvertently attempts to automatically reconfigure a target device at a time when the source device's user does not intend for the source device to be performing automatic device configuration.

In some cases, a source device may discover one or more target devices for which automatic configuration is not desired. An access-based authorization technique may be used to distinguish target devices for which automatic configuration is desired from target devices for which automatic configuration is not desired. In some embodiments, each target device may exhibit an identifier (e.g., a unique identifier), including, but not limited to, a barcode, a Quick Response (QR) code, a serial number, product identifier, etc. The identifier may be affixed to a surface of the target device, formed in the surface of the target device, or otherwise displayed on or by the target device. A user may acquire (e.g., using the camera of a smartphone or tablet) images of the device identifiers for the target devices for which automatic configuration is desired, and process those images using software (e.g., a mobile device app executing on a smartphone or tablet). For clarity, such software may be referred to herein as "configuration assistance software." In this manner, the software may identify all the target devices for which automatic configuration is desired.

To avoid inadvertently configuring target devices for which automatic configuration is not desired, the set of target devices discovered by the source device may be compared to the set of target devices identified by the configuration assistance software. In some embodiments, the configuration assistance software may execute on the source device, and the source device may compare the two sets of target devices. In some embodiments, the configuration assistance software may execute on the configuration assistance device 150, which may communicate with the source device 110 to compare the two sets of target devices. For any target device that is discovered by source device 110 but not included in the set of target devices identified by the configuration assistance software, the source device 110 may refrain from automatically configuring the target device, and/or may prompt a user of the source device 110 to confirm that automatic configuration of the target device is desired before performing the automatic configuration.

In some embodiments, using the configuration assistance software to confirm that configuration of the discovered target devices is desired before sending configuration data to a target device may enhance the security of automated configuration techniques. In particular, the use of configuration assistance software may provide protection against scenarios in which (1) a third party who does not have access to the source device attempts to use the source device to connect an unauthorized device to a network, or (2) a source device inadvertently attempts to automatically configure a target device for which automatic configuration is not desired.

Compatibility-Based Authorization.

In some embodiments, the granting of authorization for the source device 110 to send network access credentials and/or service access credentials to a target device 120 may be conditioned on the source device 110 determining that the network access credentials and/or service access credentials are compatible with the target device 120. As described above, the target device 120 may transmit type data to the source device 110, from which the source device 110 may identify one or more attributes of the target device 120, including, but not limited to, capabilities of the target device and/or applications of the target device.

In some embodiments, determining whether network access credentials are compatible with a target device 120 may comprise determining, based on the attributes of the target device, whether the target device is capable of communicating with the network access point corresponding to those network access credentials. As a simple example, network access credentials for a Wi-Fi access point are not compatible with a target device that is capable of transmitting Bluetooth signals, but is not capable of transmitting Wi-Fi signals. More generally, source device 110 may maintain (or have access to) a set of rules that can be applied to data representing a target device's attributes and data representing an access point's attributes to determine whether the target device is compatible with (e.g., capable of communicating with) the access point.

In some embodiments, determining whether service access credentials are compatible with a target device 120 may comprise determining, based on the attributes of the target device, whether the target device is capable of utilizing the network-based service corresponding to those service access credentials. As a simple example, service access credentials for a music streaming service may not be compatible with a target device that is not capable of generating sounds based on audio content. More generally, source device 110 may maintain (or have access to) a set of rules that can be applied to data representing a target device's attributes and data representing a network-based service's attributes to determine whether the target device is compatible with (e.g., capable of utilizing) the network-based service.

In some embodiments, requiring the source device to obtain compatibility-based authorization before sending configuration data to a target device may enhance the performance of automated configuration techniques. In particular, requiring compatibility based authorization may provide protection against a scenario in which a source device 110 configures a target device 120 with network access credentials and/or service access credentials that the target device 120 cannot use or for which the target device 120 is ill-adapted.

Permission-Based Authorization.

In some embodiments, the granting of authorization for the source device 110 to send network access credentials to a target device 120 may be conditioned on the source device 110 determining that it has permission to distribute the network access credentials to the target device 120. In some scenarios, a source device 110 may have network access credentials for multiple networks (e.g., a user's home Wi-Fi network, a user's employer's Wi-Fi network, etc.). For some of those networks (e.g., the user's home Wi-Fi network), the user may have the authority to connect any device to the network. For other networks (e.g., the user's employer's Wi-Fi network), the user may not have the authority to connect additional devices to the network. Thus, a mechanism is needed for ensuring that a network administrator can prohibit a source device 110 from distributing network access credentials in cases where the source device 110 does not have permission to configure other devices to connect to the network.

When network access credentials are provided to a source device 110, the provider may specify permissions indicating whether and/or under what circumstances the source device 110 can distribute those network access credentials to target devices. In some embodiments, the credentials provider may be a user who manually enters the credentials or copies the credentials to the source device. In some embodiments, the credentials provider may be another source device that is distributing the credentials to source device 110. In addition to providing the credentials, the user or other source device may configure source device 110 to enforce specified permissions for the distribution of the credentials. In some embodiments, source device 110 may obtain the credentials from a credentials repository, which may be stored on the source device 110 or accessible to source device 110 via a network. In addition to the credentials, the credentials repository may specify permissions for the distribution of the credentials. In some embodiments, the credentials repository may include profiles for different types of target devices. The profile for a target device may include configuration data for the target device.

Thus, in some embodiments, source device 110 may transmit to target device 120 all of the source device's network access credentials, only a portion of the source device's network access credentials, or none of the source device's network access credentials, depending on the permissions associated with the various network access credentials.

In some embodiments, the configuration data available to source device 110 may be organized into categories, and the granting of authorization for the source device 110 to send configuration data of a particular type to a target device 120 may be conditioned on the source device 110 determining that it has permission to distribute configuration data of that type to the target device.

As a non-limiting example, the configuration data may include a network access credentials category, a network operation category, a network-based services and profiles category, and/or a user preference category. The network access credentials category may include network access credentials. In some embodiments, the permission settings associated with this category may permit the source device to distribute all network access credentials to a target device, or restrict the distribution of network access credentials to the target device. For example, distribution may be restricted to the network access credentials corresponding to the network access point to which the source device is currently connected. As another example, distribution may be restricted based solely on any permissions specified by the provider of the network access credentials.

The network operations category may include, without limitation, quality of service settings, power management settings (e.g., a Hibernate and WakeOn profile), etc.

The network-based services and profiles category may include data that facilitates access to network-based services. Such data may include, but is not limited to, service access credentials, service address information (e.g., IP addresses, URLs, etc.), addresses of preferred servers (e.g., code download servers), and/or subscription information (e.g., for news feeds, RSS feeds, Twitter addresses, etc.).

The user preference category may include, without limitation, "favorites" information (e.g., favorite websites, favorite restaurants, favorite music stations, favorite television shows, favorite movies, favorite sports teams, favorite books, favorite blogs, favorite types of entertainment, etc.), home zones, and/or preferred temperature settings (e.g., for a thermostat associated with a heating system (e.g., a furnace or a water heater), a cooling system (e.g., an air conditioner, refrigerator, or freezer), and/or an HVAC system).

Authorization (Target Device)

After discovering a source device 110, target device 120 may determine whether acceptance of configuration data provided by target device 120 is authorized. In some embodiments, accepting network access credentials comprises storing the network access credentials in non-volatile memory and/or using at least a portion of the network access credentials to access a corresponding network. In some embodiments, accepting service access credentials comprises storing the service access credentials in non-volatile memory and/or using the service access credentials to access a corresponding network-based service.

In some embodiments, determining whether acceptance of configuration data provided by a source device is authorized comprises (1) authenticating the source device, (2) determining whether the proximity of the target device to the source device satisfies one or more criteria, (3) determining whether a user has physical access to the source device and/or the target device, and/or (4) determining whether the wireless network(s) and/or network-based service(s) corresponding to the provided configuration data are compatible with the target device. Target device 120 may use any suitable combination of these authorization techniques in any suitable order. Each of the authorization techniques is described in turn below.

Authentication-Based Authorization.

Target device 120 may use any suitable authentication technique to authenticate source device 110. In some embodiments, the authentication may be software-based, hardware-based, or software- and hardware-based. In some embodiments, the authentication technique may be symmetric or asymmetric. In some embodiments, any authentication keys used by the source device 110 and/or the target device 120 may be protected using suitable encryption techniques. In some embodiments, target device 120 may use special-purpose hardware to accelerate the computational portions of the authentication process. In some embodiments, the hardware accelerator may be integrated with the target device's processor. In some embodiments, if target device 120 is unable to authenticate source device 110, target device 120 may refrain from accepting some or all of the configuration data provided by the source device.

Proximity-Based Authorization.

In some embodiments, target device 110 includes a proximity sensor. In some embodiments, target device 120 uses the proximity sensor to determine the proximity of the target device 120 to a source device 110. In some embodiments, the granting of authorization for target device 120 to accept configuration data provided by source device 110 may be conditioned on the proximity of the source device 110 to the target device 120 satisfying one or more proximity-based authorization criteria. Techniques for determining whether the proximity of a source device 110 to a target device 120 satisfies proximity-based authorization criteria are described above. In some embodiments, these techniques are performed by target device 120.

In some embodiments, the performance of proximity-based authentication by target device 120 may be conditioned on target device 120 confirming that the signals (e.g., wireless electromagnetic signals, acoustic signals, infrared signals, etc.) received by the target device are, in fact, transmitted by the source device. In some embodiments, if the target device 120 is unable to confirm the provenance of a signal, the target device does not rely on that signal for proximity-based authorization.

In some embodiments, requiring the target device to obtain proximity-based authorization before accepting configuration data provided by a source device may enhance the security of automated configuration techniques. In particular, requiring proximity-based authorization may provide protection against scenarios in which a third party deploys a network access point in a region that is not proximate to the target device (e.g., not in the same room with the target device), and attempts to use a source device to connect the target device to the malicious network access point.

Access-Based Authorization.

In some embodiments, target device 120 includes an access sensor (e.g., a physical access sensor). In some embodiments, source device 110 uses the access sensor to determine whether a user is accessing (e.g., physically accessing) or proximate to the target device. In some embodiments, the granting of authorization for target device 120 to accept configuration data provided by source device 110 may be conditioned on the access sensor determining that a user is accessing or has recently accessed the target device. Requiring the target device to obtain access-based authorization before accepting configuration data from a target device may enhance the security of automated configuration techniques. In particular, requiring access-based authorization may provide protection against scenarios in which a third party who does not have access to the target device attempts to use a source device to reconfigure the target device.

Compatibility-Based Authorization.

In some embodiments, the granting of authorization for the target device 120 to accept network access credentials and/or service access credentials provided by a source device 110 may be conditioned on the target device 120 determining that the network access credentials and/or service access credentials are compatible with the target device 120.

In some embodiments, determining whether network access credentials are compatible with a target device 120 may comprise determining, based on the attributes of the target device, whether the target device is capable of communicating with the network access point corresponding to those network access credentials. Target device 120 may maintain (or have access to) a set of rules that can be applied to data representing the target device's attributes and data representing an access point's attributes to determine whether the target device is compatible with (e.g., capable of communicating with) the access point.

In some embodiments, determining whether service access credentials are compatible with a target device 120 may comprise determining, based on the attributes of the target device, whether the target device is capable of utilizing the network-based service corresponding to those service access credentials. Target device 120 may maintain (or have access to) a set of rules that can be applied to data representing the target device's attributes and data representing a network-based service's attributes to determine whether the target device is compatible with (e.g., capable of utilizing) the network-based service.

In some embodiments, requiring the target device to obtain compatibility-based authorization before accepting configuration data provided by a source device may enhance the performance of automated configuration techniques. In particular, requiring compatibility-based authorization may provide protection against a scenario in which a source device 110 configures a target device 120 with network access credentials and/or service access credentials that the target device 120 cannot use or for which the target device 120 is ill-adapted.

Transmission and Receipt of Configuration Data

After discovering a target device 120 and determining that the source device 110 is authorized to transmit some or all of the configuration data to the target device, source device 110 may transmit that configuration data to the target device. In some embodiments, the source device 110 may encrypt the configuration data before transmitting it to the target device. Any suitable technique for encrypting the configuration data may be used, including, without limitation, public/private key encryption. In some embodiments, source device 110 and target device 120 may establish a secure communication channel, and the source device 110 may transmit the configuration data to the target device 120 via the secure channel. Any suitable technique for establishing a secure channel between the devices may be used.

In some embodiments, source device 110 and target device 120 may communicate with each other (e.g., for the purpose of transmitting configuration data from source device 110 to target device 120) using the same transceivers, communication protocols, and/or communication standards that can be used to communicate with an access point 130, or using transceivers, communication protocols, and/or communication standards that are not compatible with an access point 130.

Further Embodiments

Returning to FIG. 1, the access points 130 may permit wireless devices to connect to network 140 using any suitable wireless communication standard and/or protocol, including, without limitation, Wi-Fi (e.g., IEEE 802.11), WiMAX, GSM, GPRS, CDMA, EVDO, UMTS, 3G, 4G, LTE, GSM, CDMA, W-CDMA, EDGE, CDMA2000, etc. In some embodiments, access points 130a and 130b may communicate with wireless devices using the same communication standards/protocols or different communication standards/protocols.

Network 140 may include any suitable type of network, including, without limitation, a wide area network (WAN), metropolitan area network (MAN), local area network (LAN), personal area networks (PANs), the Internet, etc. Network 140 may support communication using any suitable protocol, including, without limitation, the Internet protocol suite, TCP/IP, the HDLC protocol, the MAC protocol, UDP, ICMP, HTTP, POP, FTP, IMAP, etc.

Source device 110, target device 120, and configuration assistance device 150 may each comprise any suitable wireless device, including, without limitation, a laptop computer, tablet computer, smartphone, smart watch, smart television, headless wireless device, etc. In some embodiments, source device 110 and/or target device 120 may be headless. In some embodiments, source device 110 and/or target device 120 may include a display, keyboard, keypad, touchpad, touchscreen, etc. Some embodiments of wireless devices 200 are illustrated in FIG. 2 and described below.

The dashed lines in FIG. 1 illustrate optional components and/or connections. Some embodiments of system 100 do not include a configuration assistance device 150. In some embodiments, source device 110 may configure target device 120 to connect to access point 130a without source device 110 connecting to access point 130a.

In some embodiments, a wireless device WD1 may operate as a source device and/or as a target device. When a source device automatically configures WD1, WD1 may operate as a target device. When WD1 automatically configures a target device, WD1 may operate a source device. A single wireless device may operate as a source device at some times and as a target device at other times.

Figure 2:
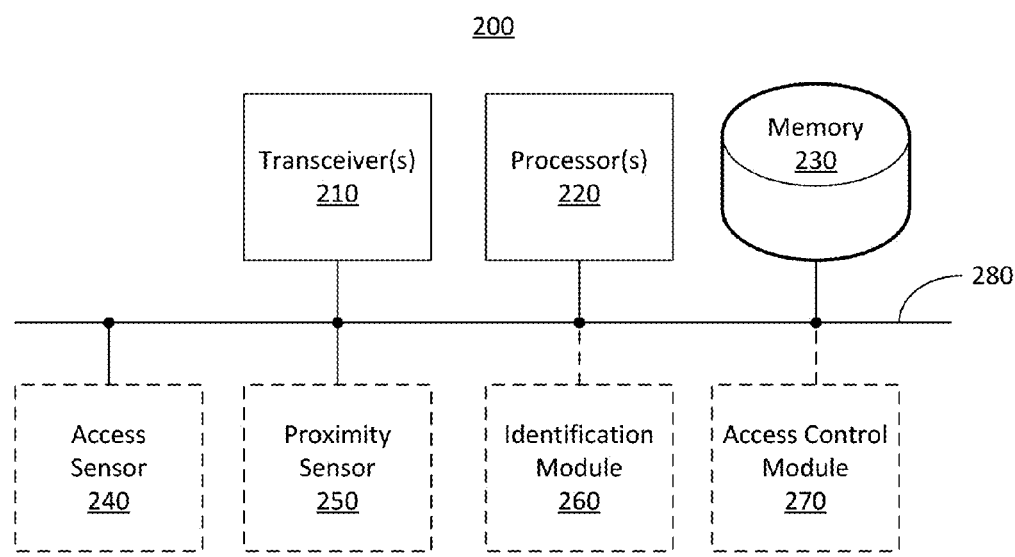
FIG. 2 shows a block diagram of a wireless endpoint device, according to some embodiments.

FIG. 2 shows a wireless device 200, according to some embodiments. Wireless device 200 includes one or more wireless transceivers 210, one or more processors 220, and one or more memory units 230. In some embodiments, wireless device 200 includes an access sensor 240, a proximity sensor 250, an identification module 260, and/or an access control module 270. The transceiver(s) 210, processor(s) 220, memory 230, access sensor 240, proximity sensor 250, identification module 260, and/or access control module 270 may be coupled by an interconnect 280.

Transceiver(s) 210 may include any suitable wireless transceiver, including, without limitation, a radio-frequency (RF) transceiver, a Wi-Fi transceiver, a transceiver configured to comply with an IEEE 802.11 standard, an optical transceiver, a near field communication (NFC) transceiver, an infrared transceiver, a Bluetooth transceiver, etc.

Processor(s) 220 may include any suitable processing devices, including, without limitation, a microprocessor device, microcontroller device, application-specific integrated circuit (ASIC), field-programmable gate array (FPGA), digital signal processor (DSP) device, central processing unit (CPU), graphics processing unit (GPU), physics processing unit (PPU), etc.

Memory 230 may include any suitable number or type of memory units, including, without limitation, volatile memory (e.g., random-access memory (RAM), dynamic RAM (DRAM), synchronous DRAM (SDRAM), static RAM (SRAM), etc.) and/or non-volatile memory (e.g., read-only memory (ROM), electrically erasable programmable ROM (EEPROM), non-volatile RAM (NVRAM), flash memory, magnetic tape, magnetic disk, hard drive, optical drive, etc.).

Access sensor 240 may be adapted to detect access (e.g., physical access) of wireless device 200 by a user. Examples of accessing the source device may include handling the source device, touching certain areas of the source device, etc. Access sensor 240 may include any suitable components, including, without limitation, an electromechanical button, an electromechanical switch, a touchscreen, a touch pad, a light sensor, a camera, etc. In some embodiments, access sensor 240 may be implemented as hardware, as software executing on processor(s) 220, or as a combination thereof.

Proximity sensor 250 may be adapted to determine the proximity of wireless device 200 and another object (e.g., the distance between the wireless device and the object), and/or to determine whether an object is proximate to the wireless device 200. In some embodiments, a proximity sensor may determine that an object is proximate to the wireless device 200 if the proximity sensor is able to detect the presence of the object or signals generated by the object. In some embodiments, a proximity sensor may determine that an object is proximate to the wireless device 200 if the proximity sensor detects signals, provided by the object, with power levels above a predetermined threshold. In some embodiments, the threshold depends on the type of signal detected. Any suitable proximity sensor may be used, including, without limitation, a wireless signal sensor (e.g., an infrared sensor) or an acoustic signal sensor. In some embodiments, proximity sensor 250 may be implemented as hardware, as software executing on processor(s) 220, or as a combination thereof. In some embodiments, proximity sensor 250 may include or use one or more transceiver(s) 210.

Identification module 260 may be adapted to display, transmit, or otherwise publish information that identifies wireless device 200. Such information may include, without limitation, a device identifier (e.g., a unique device identifier, a serial number, etc.), information indicative of the device's type (e.g., a product identifier), and/or information indicative of the device's provider (e.g., vendor, manufacturer, distributor, etc.). In some embodiments, identification module 260 comprises text, an image, a barcode, a QR code, etc., which may be displayed on a display of wireless device 200, printed or formed on a surface of wireless device 200, affixed to a surface of wireless device, or otherwise displayed on or by wireless device 200. In some embodiments, identification module 260 comprises an RFID tag. In some embodiments, identification module 260 comprises hardware, software executing on processor(s) 220, or a combination thereof.

Access control module 270 may be adapted to determine whether wireless device 200 is authorized to transmit configuration data to a target wireless device and/or to accept configuration data from a source wireless device. Some techniques for determining whether a wireless device is authorized to transmit or accept configuration data are described above with reference to FIG. 1. Access control module 270 may implement any of the authorization techniques described herein, or any combination thereof. In some embodiments, access control module 270 comprises hardware, software executing on processor(s) 220, or a combination thereof.

Interconnect 280 may have any suitable topology. In some embodiments, interconnect 280 may comprise a bus, a point-to-point network, a ring network, a mesh network, etc.

One or more wireless devices 200 may be integrated into any suitable devices or systems, including, without limitation, audio devices (e.g., speakers, HiFi systems, headphones, AVR, etc.), video devices (e.g., televisions, projectors, cinemas, over-the-top (OTT) boxes, set-top boxes, etc.), security/surveillance devices (e.g., cameras, alarms, motion sensors, location trackers, baby monitors, etc.), appliances (e.g., refrigerators, microwaves, ovens, coffee machines, washing machines, clothes dryers, water heaters, smart electrical outlets, smart door locks, smoke detectors, carbon monoxide detectors, etc.), climate control devices (e.g., thermostats, air conditioners, furnaces, fans, vent controllers, air quality monitors, humidifiers, dehumidifiers, etc.), medical devices (e.g., vital sign monitors, medication control devices, inventory control devices, pacemakers, prosthetics, hearing aids, etc.), fitness devices (e.g., heart rate monitors, scales, jump detectors, etc.), elderly care devices (e.g., motion tracking devices, voice-based interfaces, alert systems, etc.), industrial systems (e.g., inventory tracking, machine control, quality control, etc.), commercial systems (e.g., lighting control, climate control, crowd movement control, etc.), automotive systems (e.g., audio/video accessories, remote controls, vehicle tracking devices, driving pattern detectors, etc.), lighting systems (e.g., home lighting, commercial lighting, industrial lighting, etc.), toys (e.g., network-connected toys, books, etc.), retail/point-of-sale devices (e.g., card readers, e-wallets, etc.), gaming devices (e.g., handheld controllers, wearable controllers, etc.), advertising devices (e.g., billboards, digital signage, digital displays, etc.), virtual reality devices (e.g., virtual reality goggles, head-mounted displays, audio augmentation, etc.), utility devices (e.g., meters, flow control devices, safety control devices, etc. for gas, electricity, or water systems), agricultural devices (e.g., irrigation control devices, planting devices, growth monitoring devices, draught monitoring devices, etc.), municipal service systems (e.g., traffic light controllers, parking meters, street lights, etc.), emergency services systems (e.g., communication devices for police or other first responders, tracking devices, monitoring devices, accident reporting, etc.), defense systems (e.g., command and control systems), and network devices (e.g., routers, gateways, hubs, switches, etc.), and/or consumer electronics devices (e.g., mobile phones, smart phones, tablet computers, laptop computers, navigation devices, cameras, audio/video devices, printers, etc.).

Figure 3:
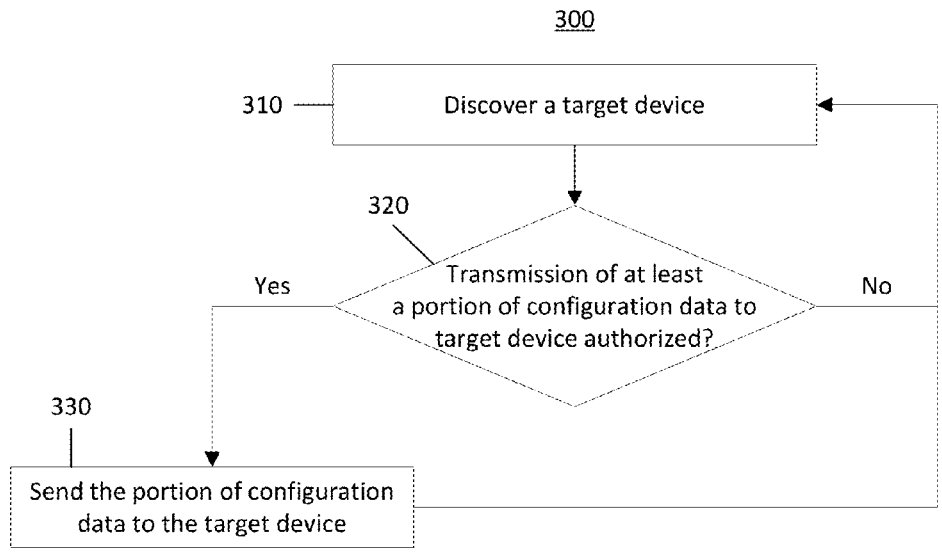
FIG. 3 is a flowchart of a method for configuring a wireless target device, according to some embodiments.

FIG. 3 illustrates a method 300 for configuring a wireless device, according to some embodiments. In some embodiments, method 300 may be performed by a wireless device 200 (e.g., a source device 110). In step 310, the source device 110 discovers one or more target devices 120. In some embodiments, discovering a target device comprises entering a discovery mode. Some embodiments of techniques for entering the discovery mode are described above. In some embodiments, discovering a target device comprises performing a discovery process. Some embodiments of a discovery process are described above.

After a target device 120 has been discovered, source device 110 may proceed to step 320. In step 320, source device 110 determines whether transmission of at least a portion of the configuration data accessible to source device 110 is authorized. Some embodiments of techniques for determining whether transmission of configuration data is authorized are described above. Such authorization techniques may include, but are not limited to, authentication-based authorization, proximity-based authorization, access-based authorization, compatibility-based authorization, and/or permission-based authorization. In some embodiments of step 320, source device 110 invokes one authorization technique, or any combination of two or more authorization techniques. In cases where two or more authorization techniques are invoked, the authorization techniques may be performed in parallel, in sequence (e.g., in any suitable order), or partially in parallel and partially in sequence. In some embodiments, one or more authorization techniques may be applied to different portions of the configuration data in parallel, in sequence, or partially in parallel and partially in sequence.

In some embodiments, if any one of the authorization techniques that is performed fails to indicate that transmission of a portion of configuration data is authorized, source device 110 may mark that portion of the configuration data as being not authorized for transmission to the target device. In some embodiments, after a portion of the configuration data has been marked as not authorized for transmission to the target device, source device 110 may cease further efforts to determine whether transmission of that portion of the configuration data to target device 120 is authorized.

If the source device 110 determines that transmission of at least a portion of configuration data to target device 120 is authorized, source device proceeds to step 330. In step 330, source device 110 transmits the authorized portion of the configuration data to target device 330. Techniques for transmitting configuration data to a target device 120 are described above. In some embodiments, source device 110 may transmit and, if necessary, retransmit the configuration data until the target device 120 acknowledges receipt, or until the configuration data has been transmitted to the target device 120 a predetermined number of times.

Figure 4:
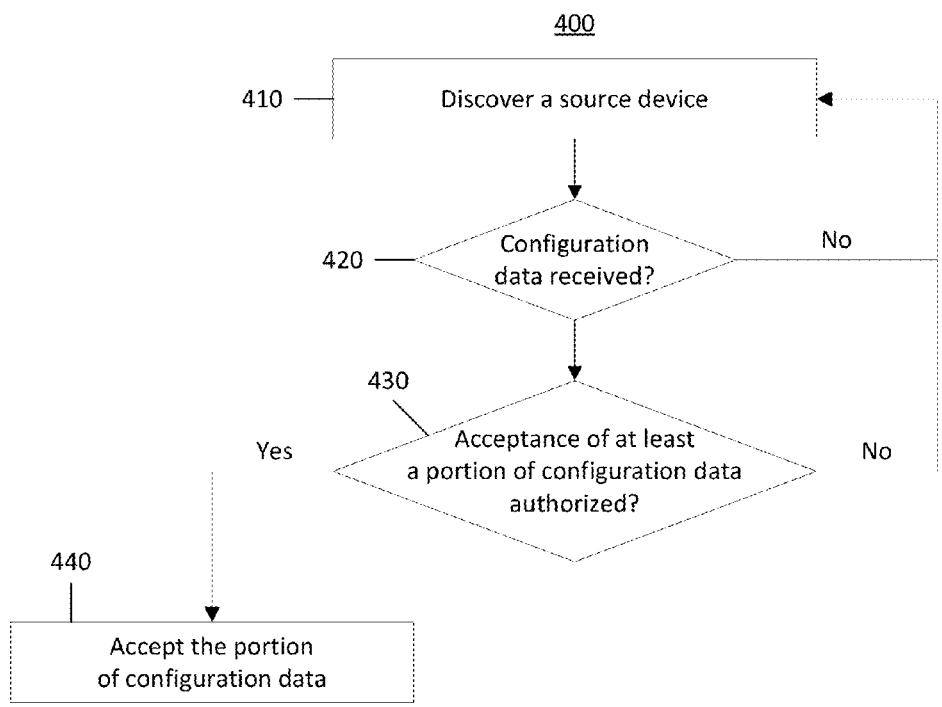
FIG. 4 is a flowchart of another method for configuring a wireless target device, according to some embodiments.

FIG. 4 illustrates a method 400 for configuring a wireless device, according to some embodiments. In some embodiments, method 400 may be performed by a wireless device 200 (e.g., a target device 120). In step 410, the target device 120 discovers one or more source devices 110. In some embodiments, discovering a source device comprises entering a discovery mode. Some embodiments of techniques for entering the discovery mode are described above. In some embodiments, discovering a source device comprises performing a discovery process. Some embodiments of a discovery process are described above.

After a source device 110 has been discovered, target device 120 may proceed to step 420. In step 420, target device 120 determines whether configuration data has been received. In some embodiments, target device 120 may transmit message(s) to source device 110 to acknowledge receipt of the configuration data.

After configuration data is received, target device 120 may proceed to step 430. In step 430, target device 120 determines whether acceptance of the received configuration data is authorized. Some embodiments of techniques for determining whether acceptance of configuration data is authorized are described above. Such authorization techniques may include, but are not limited to, authentication-based authorization, proximity-based authorization, access-based authorization, and/or compatibility-based authorization. In some embodiments of step 430, target device 120 invokes one authorization technique, or any combination of two or more authorization techniques. In cases where two or more authorization techniques are invoked, the authorization techniques may be performed in parallel, in sequence (e.g., in any suitable order), or partially in parallel and partially in sequence. In some embodiments, one or more authorization techniques may be applied to different portions of the configuration data in parallel, in sequence, or partially in parallel and partially in sequence.

In some embodiments, if any one of the authorization techniques that is performed fails to indicate that acceptance of a portion of configuration data is authorized, target device 120 may mark that portion of the configuration data as being not authorized for acceptance. In some embodiments, after a portion of the configuration data has been marked as not authorized for acceptance, target device 120 may cease further efforts to determine whether acceptance of that portion of the configuration data is authorized.

If the target device 120 determines that acceptance of at least a portion of the received configuration data is authorized, the target device proceeds to step 440. In step 440, target device 120 accepts the authorized portion of the configuration data. Techniques for accepting configuration data are described above.

In some embodiments, target device 120 may invoke one or more of the authorization techniques before any configuration data is received. For example, authentication-based authorization, proximity-based authorization, and/or access-based authorization may, in some embodiments, be performed after the source device 110 is discovered, before any configuration data is received.

Further Description of Some Embodiments

Although examples provided herein may describe modules as residing in a single memory or operations as being performed by a single processing device, it should be appreciated that the functionality of such modules can be implemented on a single memory and processing device, or on any larger number of memories and processing devices in a distributed fashion.

The above-described embodiments may be implemented in any of numerous ways. For example, the embodiments may be implemented using hardware, software or a combination thereof. When implemented in software, the software code can be executed on any suitable processor or collection of processors.

Such wireless devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be implemented as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement various embodiments. The computer readable medium or media may be non-transitory. The computer readable medium or media can be transportable, such that the program or programs stored thereon can be loaded onto one or more different wireless devices or other processors to implement various aspects described in the present disclosure. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform embodiments of methods described herein need not reside on a single wireless device or processor, but may be distributed in a modular fashion amongst a number of different wireless devices or processors.

Computer-executable instructions may be in many forms, such as program modules, executed by one or more processing devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Also, the acts performed as part of any method described herein may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a device's random access memory to provide control logic that effects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, a "computer-readable medium" (e.g., a floppy disk, a hard disk, an optical disk, a magnetic tape, a PROM, an EPROM, or CD-ROM).

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

TERMINOLOGY

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be 20%, 10%, 5%, 3%, 1%, 0.1%, or less than 0.1%, unless otherwise indicated.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus comprising:
   one or more wireless transceivers; and
   a processor configured to perform operations comprising:
      using at least one of the one or more wireless transceivers to receive, from a headless device via a point-to-point Wi-Fi network, data including one or more attributes of the device,
      based, at least in part, on the data indicating the one or more attributes of the headless device, identifying one or more network-based services compatible with the headless device, and
      using at least one of the one or more wireless transceivers to transmit, to the headless device via the point-to-point Wi-Fi network, (1) network access credentials for accessing a Local Area Network (LAN) via Wi-Fi communication with a wireless network access point, and (2) service access credentials for accessing the one or more network-based services compatible with the headless device via the LAN,
   wherein the headless device is configured to perform operations including:
      obtaining permission to access the LAN by wirelessly transmitting, directly to the wireless network access point of the LAN, the network access credentials obtained via the point-to-point Wi-Fi network,
      connecting to the LAN via Wi-Fi communication with the wireless network access point without connecting through the apparatus,
      wirelessly transmitting at least a portion of the service access credentials to at least one of the network-based services via Wi-Fi communication with the wireless network access point and via the LAN, the portion of the service access credentials corresponding to the at least one network-based service, and
      accessing the at least one network-based service via Wi-Fi communication with the wireless network access point and via the LAN.

2. The apparatus of claim 1, wherein the one or more attributes of the device include a type of the device.

3. The apparatus of claim 2, wherein identifying one or more network-based services compatible with the device based, at least in part, on the data indicating the one or more attributes of the device comprises identifying one or more network-based services compatible with the device based, at least in part, on data indicating the device type.

4. The apparatus of claim 1, wherein the network access credentials for accessing the LAN via Wi-Fi communication with the wireless network access point comprise a Service Set Identifier (SSID) and a password.

5. The apparatus of claim 1, wherein the service access credentials for a particular network-based service comprise a uniform resource locator (URL) of the network-based service, a username for an account associated with the network-based service, a password for the network-based service account, a personal identification number (PIN) for the network-based account, a public encryption key for encrypting communications sent to the network-based service, a private encryption key for decrypting communications received from the network-based service, and/or an authentication certificate.

6. The apparatus of claim 1, wherein the operations further comprise:
    selecting, from a plurality of networks, the LAN for which the network access credentials are to be transmitted to the device,
    wherein the LAN is selected based, at least in part, on a determination that the apparatus is authorized to transmit the network access credentials of the LAN to the device.

7. The apparatus of claim 6, wherein the operations further comprise:
    obtaining network access credentials for the plurality of networks; and
    receiving, for the LAN, data indicating that the apparatus is authorized to transmit the network access credentials of the LAN to any device.

8. The apparatus of claim 6, wherein the operations further comprise:
    obtaining network access credentials for the plurality of networks; and
    receiving, for the LAN, data indicating that the apparatus is authorized to transmit the network access credentials of the LAN to a device having a specified device identifier and/or to devices of a specified type.

9. The apparatus of claim 1, further comprising a physical access sensor configured to detect a physical access of the apparatus by a user, wherein the operations further comprise receiving a signal from the physical access sensor indicating that a physical access of the apparatus has been detected, and wherein the processor is configured to transmit the network access credentials and the service access credentials based, at least in part, on receiving the signal indicating detection of the physical access to the apparatus.

10. The apparatus of claim 9, wherein the physical access sensor comprises an electromechanical button, an electromechanical switch, a touchscreen, a touch pad, a light sensor, and/or a camera.

11. The apparatus of claim 1, further comprising a proximity sensor configured to determine a proximity of the device to the apparatus, wherein the operations further comprise determining whether the proximity of the device to the apparatus satisfies one or more criteria, and wherein the processor is configured to transmit the network access credentials and the service access credentials based, at least in part, on a determination that the proximity of the device to the apparatus satisfies the one or more criteria.

12. The apparatus of claim 11, wherein the proximity sensor comprises a wireless signal sensor configured to determine a power level of a wireless signal received from the device, and wherein determining whether the proximity of the device to the apparatus satisfies the one or more criteria comprises determining whether the power level of the wireless signal received from the device exceeds a threshold power level.

13. The apparatus of claim 11, wherein the proximity sensor comprises an acoustic sensor configured to sense an acoustic carrier signal received from the device, and wherein determining whether the proximity of the device to the apparatus satisfies the one or more criteria comprises determining whether a power level of an analog or digital coded signal modulated on the acoustic carrier signal exceeds a threshold power level.

14. The apparatus of claim 11, wherein the proximity sensor comprises an infrared sensor, and wherein determining whether the proximity of the device to the apparatus satisfies the one or more criteria comprises determining whether the infrared sensor has received an infrared signal from the device.

15. A system comprising:
    a first headless endpoint device configured to perform operations including wirelessly transmitting data including one or more attributes of the first endpoint device via a point-to-point Wi-Fi network; and
    a second headless endpoint device configured to perform operations including:
        wirelessly receiving, from the first endpoint device via the point-to-point Wi-Fi network, the data including the one or more attributes of the first endpoint device,
        based, at least in part, on the data indicating the one or more attributes of the first endpoint device, identifying one or more network-based services compatible with the first endpoint device, and
        wirelessly transmitting, to the first endpoint device via the point-to-point Wi-Fi network, (1) network access credentials for accessing a Local Area Network (LAN) via Wi-Fi communication with a wireless network access point, and (2) service access credentials for accessing the one or more network-based services compatible with the device via the LAN,
    wherein the first endpoint device is further configured to perform operations including:
        obtaining permission to access the LAN by wirelessly transmitting, directly to the wireless network access point of the LAN, the network access credentials obtained via the point-to-point Wi-Fi network,
        connecting to the LAN via Wi-Fi communication with the wireless network access point without connecting through the second endpoint device,
        wirelessly transmitting at least a portion of the service access credentials to at least one of the network-based services via Wi-Fi communication with the wireless network access point and via the LAN, the portion of the service access credentials corresponding to the at least one network-based service, and
        accessing the first at least one network-based service via Wi-Fi communication with the wireless network access point and via the LAN.

16. The system of claim 15, wherein the one or more attributes of the first endpoint device include a type of the first endpoint device.

17. The system of claim 16, wherein identifying one or more network-based services compatible with the first endpoint device based, at least in part, on the data indicating the one or more attributes of the first endpoint device comprises identifying one or more network-based services compatible with the first endpoint device based, at least in part, on data indicating the first endpoint device type.

18. The system of claim 15, wherein the second endpoint device is further configured to perform operations including:
    selecting, from a plurality of networks, the LAN for which the network access credentials are to be transmitted to the first endpoint device,
    wherein the LAN is selected based, at least in part, on a determination that the second endpoint device is authorized to transmit the network access credentials of the LAN to the first endpoint device.

19. The system of claim 18, wherein the second endpoint device is further configured to perform operations including:
    obtaining network access credentials for the plurality of networks; and receiving, for the LAN, data indicating that the second endpoint device is authorized to transmit the network access credentials of the LAN to other devices.

20. The system of claim 18, wherein the second endpoint device is further configured to perform operations including:
obtaining network access credentials for the plurality of networks; and
receiving, for the LAN, data indicating that the second endpoint device is authorized to transmit the network access credentials of the LAN to a device having a specified device identifier and/or to devices of a specified type.

21. The system of claim 15, wherein the first endpoint device comprises a physical access sensor configured to detect a physical access of the first endpoint device by a user, and wherein the first endpoint device is further configured to perform operations comprising:
receiving a signal from the physical access sensor indicating that a physical access of the first endpoint device has been detected,
entering a discovery mode, and
in the discovery mode, accepting the network access credentials and the service access credentials transmitted by the second endpoint device.

22. The system of claim 15, wherein the first endpoint device comprises a proximity sensor configured to determine a proximity of the second endpoint device to the first endpoint device, and wherein the first endpoint device is further configured to perform operations comprising:
determining whether the proximity of the second endpoint device to the first endpoint device satisfies one or more criteria,
entering a discovery mode based on determining that the proximity of the second endpoint device to the first endpoint device satisfies the one or more criteria, and
in the discovery mode, accepting the network access credentials and the service access credentials transmitted by the second endpoint device.

23. The system of claim 22, wherein the proximity sensor comprises a wireless signal sensor configured to determine a power level of a wireless signal received from the second endpoint device, and wherein determining whether the proximity of the second endpoint device to the first endpoint device satisfies the one or more criteria comprises determining whether the power level of the wireless signal received from the second endpoint device exceeds a threshold power level.

24. A system comprising:
one or more wireless transceivers; and
a processor configured to perform operations comprising:
using at least one of the one or more wireless transceivers to receive, from a headless device via a point-to-point Wi-Fi network, (1) network access credentials for accessing a Local Area Network (LAN) via Wi-Fi communication with a wireless network access point, and (2) service access credentials for accessing one or more network-based services via the LAN,
based, at least in part, on one or more attributes of an apparatus comprising the wireless transceivers and the processor, identifying, from among the one or more network-based services, at least one network-based service compatible with the apparatus,
obtaining permission to access the LAN by using at least one of the one or more wireless transceivers to wirelessly transmit, directly to the wireless network access point of the LAN, at least a portion of the network access credentials received via the point-to-point Wi-Fi network,
connecting to the LAN via Wi-Fi communication with the wireless network access point without connecting through the headless device,
using at least one of the one or more wireless transceivers to wirelessly transmit, to the at least one network-based service via Wi-Fi communication with the wireless network access point and via the LAN, a portion of the service access credentials corresponding to the at least one network-based service, and
accessing the network-based service via Wi-Fi communication with the wireless network access point and via the LAN.

25. The system of claim 24, further comprising a proximity sensor, wherein the operations further comprise:
determining, using the proximity sensor, a proximity of the apparatus to the device; and
determining whether the proximity of the apparatus to the device satisfies one or more criteria,
wherein transmitting the network access credentials to the network access point is performed in response to determining that the proximity of the apparatus to the device satisfies the one or more criteria.

26. A method comprising:
transmitting, using one or more wireless transceivers, data including one or more attributes of an apparatus,
using at least one of the one or more wireless transceivers to receive, from a headless device via a point-to-point Wi-Fi network, (1) network access credentials for accessing a Local Area Network (LAN) via Wi-Fi communication with a wireless network access point, and (2) service access credentials for accessing one or more network-based services compatible with the apparatus via the LAN,
determining, using a proximity sensor, a proximity of the device to the apparatus,
determining whether the proximity of the device to the apparatus satisfies one or more criteria,
in response to determining that the proximity of the device to the apparatus satisfies the one or more criteria, accepting the network access credentials and the service access credentials received from the device,
obtaining permission to access the LAN by using at least one of the wireless transceivers to transmit the accepted network access credentials directly to the wireless network access point of the LAN,
connecting to the LAN via Wi-Fi communication with the wireless network access point without connecting through the headless device,
using at least one of the wireless transceivers to wirelessly transmit at least a portion of the service access credentials to a particular network-based service via Wi-Fi communication with the wireless network access point and via the LAN, and
accessing the particular network-based service via Wi-Fi communication with the wireless network access point and via the LAN.

27. The method of claim 26, wherein accepting the network access credentials comprises storing the network access credentials in non-volatile memory and/or using the network access credentials to access the LAN.

28. The method of claim 26, wherein accepting the service access credentials comprises storing the service access credentials in non-volatile memory and/or using at least a portion of the service access credentials to access at least one of the one or more network-based services.

29. The method of claim 26, further comprising using a physical access sensor to detect a physical access of the apparatus by a user, wherein the data including the one or more attributes of the apparatus are transmitted based on the physical access sensor detecting the physical access of the apparatus by the user.

30. The method of claim 26, wherein the one or more network-based services are identified by the device based, at least in part, on the data indicating the one or more attributes of the apparatus.

* * * * *